United States Patent [19]

Hazen

[11] Patent Number: 5,568,785
[45] Date of Patent: Oct. 29, 1996

[54] UTILITY MARKING DEVICE

[76] Inventor: Hallie W. Hazen, 1812 Vista Bonits Dr., E, Mobile, Ala. 36609

[21] Appl. No.: 510,606

[22] Filed: Aug. 3, 1995

[51] Int. Cl.$^6$ .................................................. E04H 13/00
[52] U.S. Cl. ................................ 116/209; 52/103; 52/153
[58] Field of Search ............................... 116/209; 52/103, 52/104, 105, 153, 155, 163, 154; 248/530, 532, 533, 545, 156

[56] References Cited

U.S. PATENT DOCUMENTS

| | | | |
|---|---|---|---|
| 227,257 | 5/1880 | Irion | 52/155 |
| 282,711 | 2/1886 | Nelson . | |
| 1,165,459 | 12/1915 | Sprague | 52/153 |
| 1,321,824 | 11/1919 | Heim | 52/155 |
| 2,103,948 | 12/1937 | Jones | 248/156 |
| 2,501,895 | 3/1950 | Gayle | 248/156 |
| 3,785,331 | 1/1974 | Ferris | 52/103 |
| 3,927,637 | 12/1975 | Sammaritano . | |
| 4,416,414 | 11/1983 | Edgerton . | |
| 4,649,678 | 3/1987 | Lamson | 52/103 |
| 4,738,060 | 4/1988 | Marthaler et al. | 52/103 |
| 4,852,512 | 8/1989 | Klatt . | |
| 5,056,454 | 10/1991 | Turner . | |
| 5,152,495 | 10/1992 | Jacinto et al. | 248/530 |
| 5,161,561 | 11/1992 | Jamieson | 248/530 |
| 5,217,194 | 6/1993 | Brownell | 248/530 |
| 5,247,900 | 9/1993 | Sobczak . | |
| 5,291,703 | 3/1994 | Ziegler | 52/103 |
| 5,463,834 | 10/1995 | Krieger | 52/155 |

FOREIGN PATENT DOCUMENTS

| | | | |
|---|---|---|---|
| 2325079 | 11/1974 | Germany | 52/155 |
| WO93/19447 | 9/1993 | WIPO | 116/209 |

*Primary Examiner*—William A. Cuchlinski, Jr.
*Assistant Examiner*—Andrew Hirshfeld
*Attorney, Agent, or Firm*—Joseph N. Breaux

[57] ABSTRACT

A marking device for marking the location of underground utility lines including an indicating member having at least one substantially planar surface and a positioning member rigidly secured to the indicating member that includes a stake member oriented perpendicularly with respect to the substantially planar surface having a plurality of stabilizing members extending therefrom and oriented at an angle of between thirty and sixty (30°, 60°) degrees thereto. The stabilizing members are constructed from a material having sufficient resilience to allow each stabilizing member to flex while the stake member is inserted into the earth. The indicating member includes indicia indicating at east one type of utility and indicia indicating a direction of travel with respect to the indicating member.

1 Claim, 4 Drawing Sheets

5,568,785

UTILITY MARKING DEVICE

TECHNICAL FIELD

The present invention relates to devices used to mark the location of underground utility supply lines and more particularly to devices used to mark the location of underground utility supply lines that indicate the direction of travel of the supply line and include structures engageable with the surrounding earth that prevent the direction indicated by the device from being readily altered.

BACKGROUND ART

Most home owners have, at one time or another, had to determine the location of underground utility supply lines, such as water, sewer, electrical power, telephone, and/or cable lines, that service the home. Although most municipalities have utility locating services available at little or no charge, these services can take up to several days advance notice before the homeowner is provided with the required location information. It would be a benefit, therefore, to have a device for marking the location and path of the underground utility supply lines servicing a particular house that could be positioned on the property in advance of any need to know the path and location of the various utility supply lines and that could be referenced when and if the need to know the location and bath of any particular utility line was needed or the need for an area containing no utility supply lines such as for building a shed or above ground swimming pool. It would be a further benefit if the device had a mechanism for maintaining the marking device in the original position to prevent erroneous indications from being given by the marking device.

GENERAL SUMMARY DISCUSSION OF INVENTION

It is thus an object of the invention to provide a utility marking device that may be positioned on the earth surface above the location of an underground utility supply line that provides an indication of the type of utility line and the direction of travel of the utility line with respect to the marker.

It is a further object of the invention to provide a utility marking device that includes structures engageable with the subsurface soils in the area of the device in a manner to prevent rotation of the device once positioned in a desired position by a user.

It is a still further object of the invention to provide a utility marking device that includes an indicating member that provides visual indicia of the type of utility located beneath the indicating member, the direction of travel of the utility supply line, and that is securable in a substantially flush relationship with the surface of the earth upon which it is positioned by a stake member insertable within the earth that includes a plurality of anti-stake rotation protrusions extending from the stake member.

It is a still further object to provide a utility marking device that achieves all or some of the above objects in combination.

Accordingly, a marking device for indicating the location and direction of travel of underground utility lines is provided. The marking device includes an indicating member having at least one substantially planar surface and a positioning member rigidly secured to the indicating member that includes a stake member oriented perpendicularly with respect to the substantially planar surface having a plurality of stabilizing members extending therefrom and oriented at an angle of between thirty and sixty (30°, 60°) degrees thereto. The stabilizing members are constructed from a material having sufficient resilience to allow each stabilizing member to flex while the stake member is inserted into the earth. The indicating member includes indicia indicating at least one type of utility and indicia indicating a direction of travel with respect to the indicating member. The indicia located on the indicating member are preferably integrally formed with the indicating member in either a raised or carved-out manner. The indicating member is preferably at least three times broader than it is thick, and more preferably, substantially disk shaped with the stake member extending from the center of one side surface thereof. Use of a thin indicating member positioned flush with the surface of the ground, allows the mowing and maintenance of the lawn to be continued in the ordinary manner.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
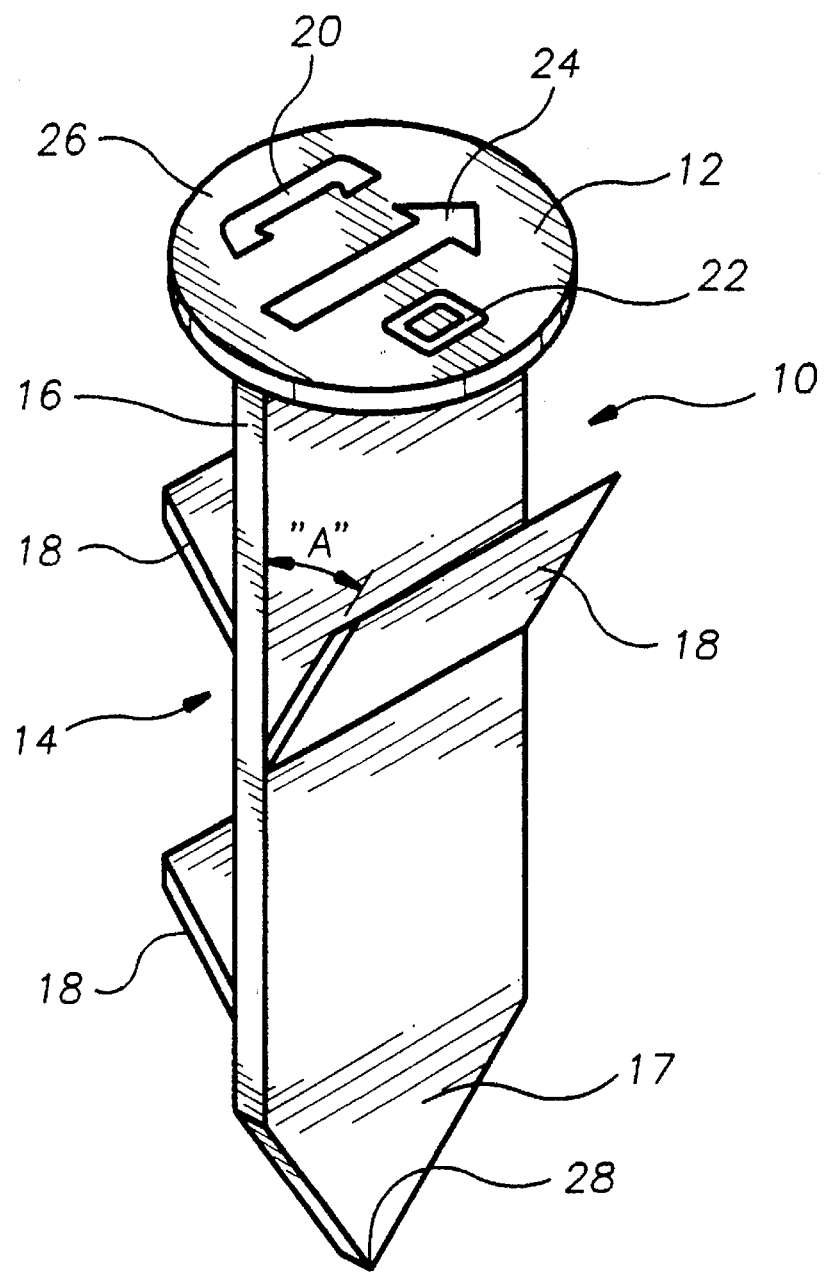
FIG. 1 is a perspective view of an exemplary embodiment of the utility marking device of the present invention with a substantially planar stake member and three substantially planar stabilizing members.

FIG. 1 is a perspective view of an exemplary embodiment of the utility marking device of the present invention generally referenced by the numeral 10. Marking device 10 includes a disk shaped indicating member 12; and a positioning member, generally indicated by the numeral 14, comprising a stake member 16 having three planar stabilizing members 18. Indicating member 12 is a three and one-half (3½")inch diameter, one-half (½") inch thick, plastic disk having two raised sculptural utility-type indicia 20,22 and one raised sculptural directional-type indicia 24 located on an otherwise substantially planar upper surface 26 thereof. Directional-type indicia 24 indicates a terminal end of a supply line. Utility-type indicia 20 indicates a phone line. Utility-type indicia 22 indicates a cable T.V. line.

Stake member 16 is about six (6") in length, about three and one-half (3½") inches in width, and about one-quarter (¼") inch in thickness. The three stabilizing members 18 are each integrally formed with stake member 16; are each about three and one-half (3½") inches in width, about one (1") inch in length, and about one-quarter (¼") inch thick; and are each angled with respect to stake member 16 at an angle "A" of about thirty (30°) degrees. An angled tip 28 is provided at a distal end 17 of stake member 16 to aid insertion of stake member 16 into the ground.

Figure 2:
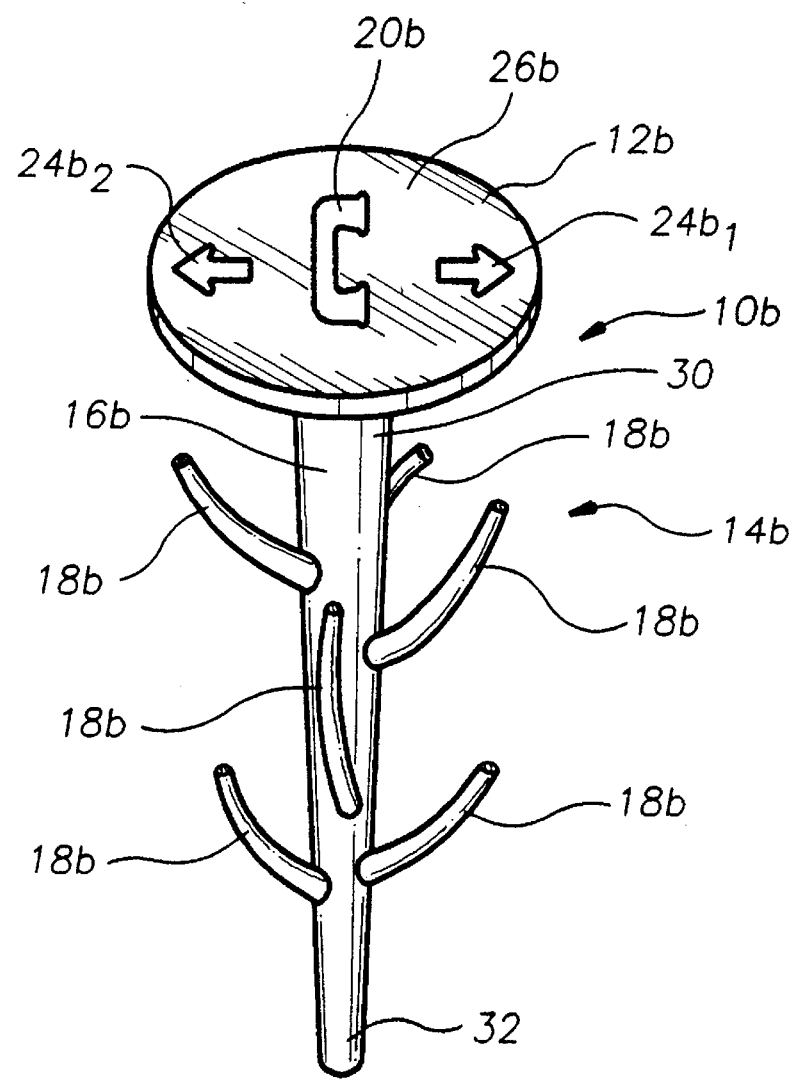
FIG. 2 is a perspective view of a second exemplary embodiment of the utility marking device having a substantially cone shaped stake member and six arcuate stabilizing members extending outwardly therefrom.

FIG. 2 is a perspective view of a second exemplary embodiment of the utility marking device of the present invention generally referenced by the numeral 10b. Marking device 10b includes a disk shaped indicating member 12b; and a positioning member, generally indicated by the numeral 14b, comprising a conically shaped stake member 16b having six arcuate stabilizing members 18b. Indicating member 12b is constructed in the same manner as indicating member 12 above, however, indicating member 12b includes only one raised sculptural utility-type indicia 20b and two raised sculptural directional-type indicia $24b_1, 24b_2$ located on an otherwise substantially planar upper surface 26b thereof. Utility-type indica 20b indicates a telephone line. Directional-type indicia $24b_1$ and $24b_2$ indicate a utility supply line extends beneath indicating member 12b along the line indicated by directional-type indicia $24b_1$ and $24b_2$.

Stake member 16b is about six (6") in length and tapers from a diameter of about one (1") inch at a first end 30 to a diameter of about one-quarter (¼") inch at a second end 32. The six stabilizing members 18b are integrally formed with stake member 16b, are about one (1") inch long, and are curved along an arc defined by about an eight inch radius and away from second end 32 of stake member 16b.

Figure 3:
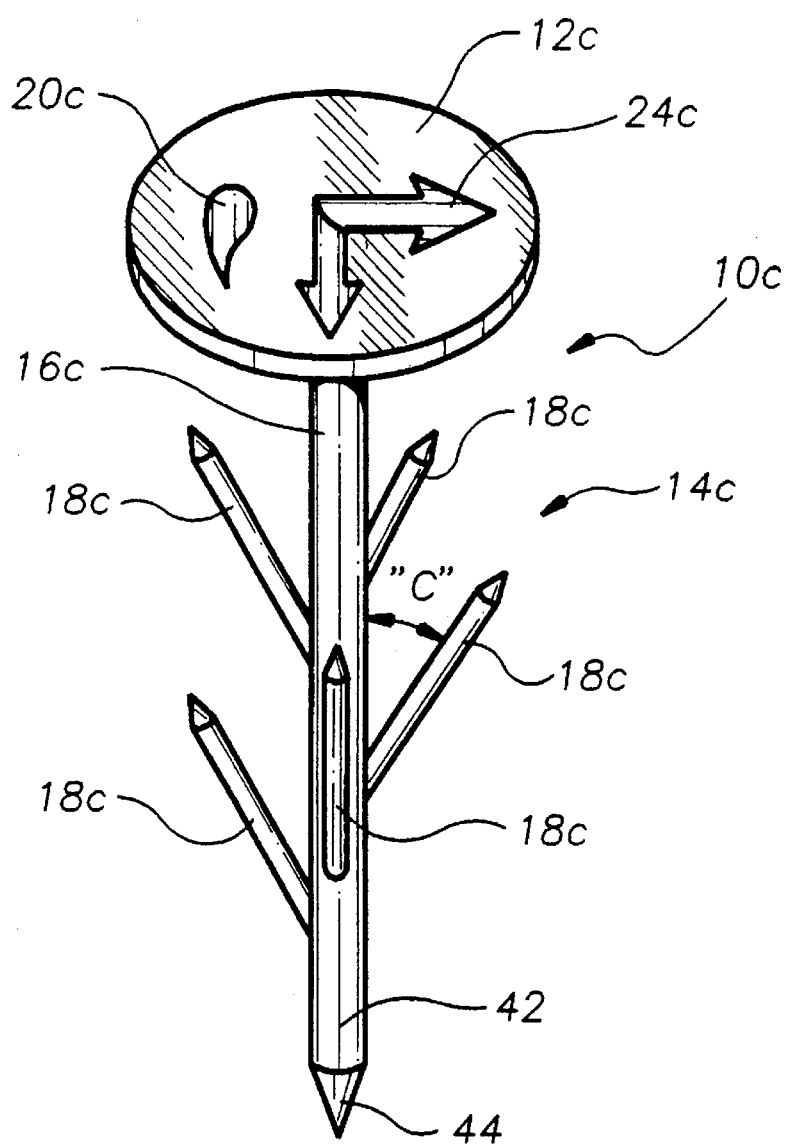
FIG. 3 is a perspective view of a third exemplary embodiment of the utility marking device of the present invention having a sharpened dowel shaped stake member and a five sharpened dowel shaped stabilizing members extending therefrom.

FIG. 3 is a perspective view of a third exemplary embodiment of the utility marking device of the present invention generally referenced by the numeral 10c. Marking device 10c includes a disk shaped indicating member 12c; and a positioning member, generally indicated by the numeral 14c, comprising a dowel shaped stake member 16c having five dowel shaped stabilizing members 18c. A distal end 42 of stake member 16c has a cortically shaped tip 44 for aiding insertion of stake member 16c into the ground. Indicating member 12c is constructed in the same manner as indicating member 12 above, however, indicating member 12c includes only one carved-out utility-type indicia 20c and one carved-out directional-type indicia 24c located on an upper surface 26c thereof. Utility-type indica 20c indicates a water line. Directional-type indicia 24c indicates a ninety (90°) degree bend in the utility supply line buried beneath indicating member 12c.

Stake member 16c is about six (6") in length and has a diameter of about one-half (½") inch along the length thereof. At distal end 42, tip 44 tapers to a diameter of about one-eighth (⅛") inch. The five stabilizing members 18c are each integrally formed with stake member 16c, are each about one (1") inch long, and are each angled at an angle "C" of about forty (40°) degrees with respect to stake member 16c.

Figure 4:
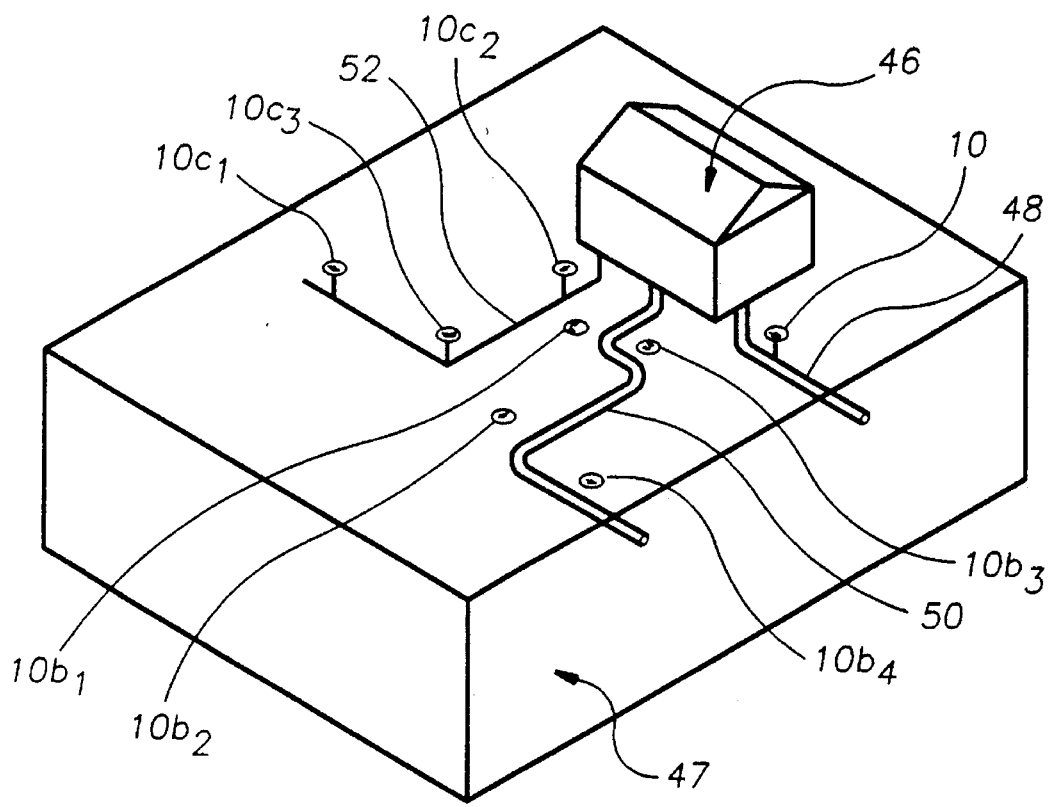
FIG. 4 is a perspective view of a representative building having various underground utility supply lines supplying utilities thereto wherein the pathway and type of utility are shown indicated by various utility marking devices of the present invention.

Use of utility marking devices 10, 10b and 10c are now described with reference to FIGS. 1–4. FIG. 4 is a perspective, cut-out, view of a representative building, generally referenced by the numeral 46, situated upon a section of ground, generally referenced by the numeral 47, having three representative underground utility supply lines 48, 50, 52 supplying, respectively, drainage, water, and telephone services. Also shown in the figure, in connection with utility line 48 is a marking device 10 as previously described herein before. Device 10 is installed above drainage line 48 by inserting stake member 16 into the ground directly above sewerage line 48 with the direction indicia 24 indicating the desired direction until indicating member 12 is flush with the ground surface.

Four marking devices $10b_1$–$10b_4$, as described herein before, are shown in connection with water supply line 50.

The four devices $10b_{1-4}$ are installed above drainage line 50 by inserting stake member 16b into the ground directly above water supply line 50 until indicating member 12b is flush with the ground surface. In this figure, devices $10b_{1-3}$ indicate a water supply line completing a ninety (90°) degree bend. Device $10b_4$ indicates a straight line path.

Three marking devices $10c_1$–$10c_3$, as described herein before, are shown in connection with telephone line 52. The three devices $10b_{1-3}$ are installed above telephone line 52 by inserting stake member 16c into the ground directly above telephone line 52 until indicating member 12c is flush with the ground surface. In this figure, devices $10c_{1-2}$ indicate a telephone line traveling a straight path in an indicated direction. Device $10c_3$ indicates a telephone line completing a ninety (90°) degree bend.

It can be seen from the preceding description that a utility marking device that may be positioned on the earth surface above the location of an underground utility supply line has been provided that 1) provides an indication of the type of utility line and the direction of travel of the utility line with respect to the marker; that 2) includes structures engageable with the subsurface soils in the area of the device in a manner to prevent rotation of the device one positioned in a desired position by a user; and that 3) includes an indicating member that provides visual indicia of the type of utility located beneath the indicating member, the direction of travel of the utility supply line, and that is securable in a substantially flush relationship with the surface of the earth upon which it is positioned by a stake member insertable within the earth that includes a plurality of anti-stake rotation protrusions extending from the stake member.

It is noted that the embodiment of the utility marking device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A utility marking device comprising:

a substantially disk shaped indicating member having at least one substantially planar surface, said indicating member including integrally formed utility indicia indicating at least one type of utility and integrally formed direction indicia indicating a direction of travel with respect to said indicating member, said indicating member being at least three times broader in a first direction than said indicating member is thick in a second direction, said second direction being orthogonal to said first direction; and a positioning member rigidly secured to said indicating member and extending from a center of a side surface of said indicating member, said positioning member including a conically shaped stake member, oriented perpendicularly with respect to said substantially planar surface, said stake member having six stabilizing members extending therefrom that each have a curve along the entire length thereof having a radius of curvature of about eight inches, said stabilizing members each curving away from a tip of said stake member, said stabilizing members being constructed from a material having sufficient resilience to allow each said stabilizing member to flex while said stake member is inserted into soil located above a utility line.

* * * * *